FERROELECTRIC MATERIALS

Filed Aug. 7, 1958

INVENTORS
HERBERT L. BERMAN
& JAMES F. TRIBBY
BY Wade Koontz and Martin J. Finnegan
ATTORNEYS United States Patent Office 3,013,977
Patented Dec. 19, 1961

3,013,977
FERROELECTRIC MATERIALS

Herbert L. Berman, Skokie, and James F. Tribby, Chicago, Ill., assignors to the United States of America as represented by the Secretary of the Air Force Filed Aug. 7, 1958, Ser. No. 753,853
2 Claims. (Cl. 252—62.9)

Figure 1:
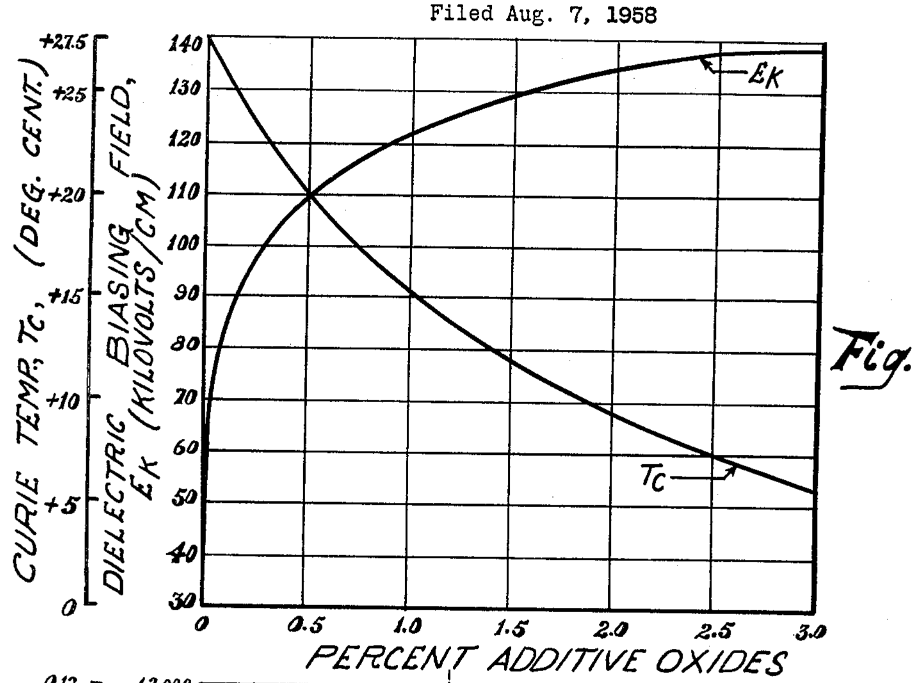

This invention relates to ferroelectric materials, and more particularly, to an improvement in the dielectric properties of ferroelectric materials.

Ferroelectric materials have been found suitable for fabricating electrical components or components responsive to electrical energy because of the unique properties possessed by these materials below a critical temperature, commonly referred to as the Curie temperature.

Below the Curie temperature, some ferroelectric materials are piezoelectric, exhibiting a domain structure, with ions included in the crystal lattice which are displaced by electrical energy. If a strong electric field is applied to the material, the electric axes of the domains orientated at right angles to the filed are rotated into the direction of the field and a crystal is created with some axes parallel to the field. The parallel alignment of the axes causes the crystal to become thicker than it is without the field. If a strong D.-C. bias is once applied, some of the induced domain alignment persists after the field is removed, which can be likened to a residual internal field. The application of a small A.-C. field to the crystal results in a thickness vibration at the frequency of the A.-C. field. The internal field acts very much like the D.-C. polarizing current in a magnetostrictive transducer.

A phenomenon analogous to magnetic hysteresis occurs when an A.-C. field is applied to a ferroelectric material. The shapes of these hysteresis loops are sensitive to small amounts of impurity and to the previous thermal and electric history of the specimen.

A ferroelectric material, such as barium titanate, has been the object of extensive study because of its high dielectric and electromechanical properties. This material has been found useful for the fabrication of nonlinear capacitors and acoustic devices. A serious limitation in the use of this material for these purposes is the relatively low electric field at which the material does not function adequately as a dielectric material and the depolarization which occurs at the Curie temperature. Various additives, such as calcium titanate, $CaTiO_3$, magnesium titanate, $MgTiO_3$, lead titanate, $PbTiO_3$, and complexes such as ferroelectric niobates, zirconates, and tantalates have been added to other ferroelectric ceramic compounds, such as barium titanate, to improve its dielectric properties. However, none of these materials, or the compound formed by adding these materials to the pure compound has a dielectric breakdown field greater than the pure compound, although certain additives are effective in shifting the Curie temperature of the pure compound. For example, strontium titanate has been found to shift the Curie temperature downward, while zirconium oxide has been found to shift it upward.

It is an object of the present invention to improve the dielectric properties of ferroelectric materials.

It is an object of the present invention to improve the dielectric properties of ferroelectric materials without interfering with the advantageous properties expected by also incorporating a Curie-temperature controlling material therein.

It is an object of the present invention to improve the dielectric properties of a ferroelectric material without altering the ferroelectric and piezoelectric properties of the material.

Accordingly, the present invention involves the addition of equimolar parts of titanium and cobaltic oxides to materials selected for preparing a ferroelectric ceramic material to produce a material having an exceptionally high dielectric field strength. Stated more broadly, the addition of the additive substance of the present invention to a ferroelectric material produces a ferroelectric material capable of withstanding higher dielectric biasing fields.

Figure 2:
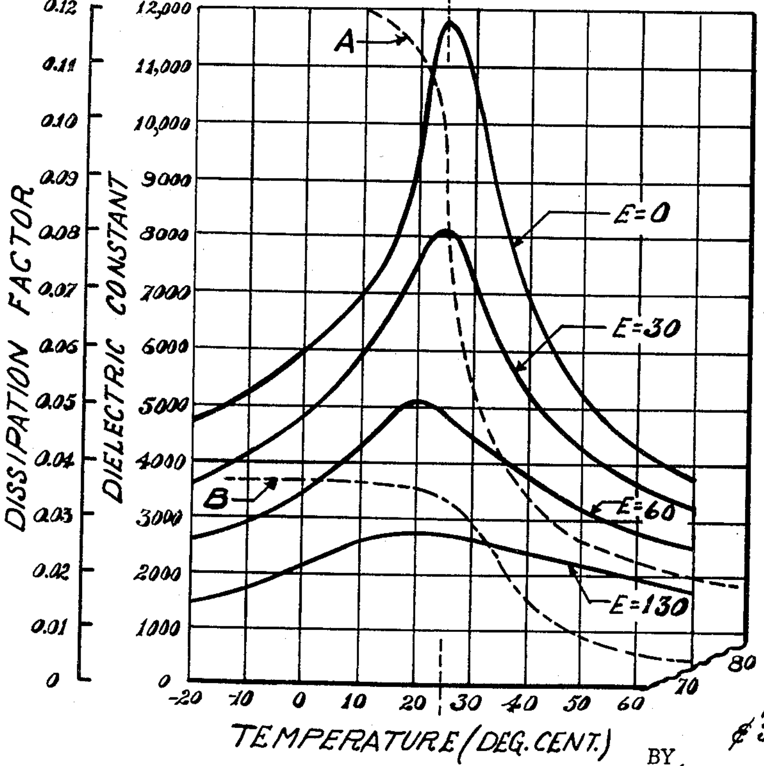

The foregoing objects, features, and general description of the invention will be more clearly understood and made evident by referring to the following detailed description taken in conjunction with the accompanying drawings, wherein:

FIG. 1 is a graphical representation of the characteristics of ferroelectric materials including varying percentages of an additive oxide of the present invention; and FIG. 2 is a graphical representation of the characteristics of a particular ferroelectric material under varying conditions.

Improved ferroelectric materials were prepared in accordance with the following method. In one improved ferroelectric material, sufficient quantities of barium carbonate $BaCO_3$, strontium carbonate $SrCO_3$, titanium oxide $TiO_2$, and cobaltic oxides $Co_2O_3$ were weighed out to form a complex titanate of barium and strontium wherein 74 percent was barium titanate, 23 percent was strontium titanate, and 3 percent was equimolar parts of titanium and cobaltic oxides. Alternatively, the oxides of barium and strontium could be employed to obtain the same improved characteristics of a ferroelectric material including the additive material. A wetting agent was added to the mass formed by mixing the ingredients and the mass was thoroughly mixed with water. The resulting slurry was dried for approximately 48 hours at 120° C. After drying, the solid material was pulverized and pressed into discs of suitable size, which preferably had a diameter of one inch and a thickness of one-quarter inch. These discs were then calcined at approximately 1250° C. for one hour. The calcined discs were then reduced to a fine powder by wet-ball milling and the powder dried again at 1250° C. After drying, the mass was again pulverized and sifted through a fine screen, such as 320 nylon mesh. The powdered material was then capable of being molded into any desired shape. After molding, the material was sintered at a peak temperature of 1360° C., for one to two hours, depending on the thickness of the sample. Capacitor elements may be fabricated in this manner by affixing electrodes to the sintered sample by firing on a silver paint or by vacuum evaporating a metallic coating.

The improved characteristics of ferroelectric materials including up to 3 percent of the additive material is shown graphically in FIG. 1, wherein the percentages of the additive oxides in ferroelectric materials are plotted against varying magnitudes of a dielectric biasing field and against changes in the Curie temperature of the resulting ferroelectric material. The data was compiled from tests conducted on capacitors fabricated from mixtures of barium and strontium titanate wherein the percentage of barium titanate by weight is 74 and that of strontium titanate varies from 26 percent to 23 percent to allow for the addition of the additive material. The capacitors had a diameter of 1 millimeter and a thickness of 23 microns. The Curie temperature of the samples is indicated by the symbol $T_c$.

At the outset it is apparent that the Curie temperature decreases to some extent as the breakdown strength increases. Upon further inspection, it is apparent that the dielectric biasing field increases from approximately 30 to 40 kilovolts per centimeter for the 74 to 26 percent barium-strontium mixture to approximately 130 kilovolts per centimeter for compounds including 3 percent by weight of the additive oxides in equimolar parts. Additionally, it is evident that the Curie temperature of the compound varies about 25° C. with percentages of the additive oxides up to 3 percent by weight. This latter effect is not a limitation on the usefulness of the present invention since the Curie temperature can be raised by the addition of certain materials, including barium as a constituent thereof, and additionally, adequate cooling can be employed to prevent the temperature from rising to critical ranges near the Curie temperature, and such ferroelectric materials may be used in pulsed circuits wherein generated heat is not a significant factor in the use of such materials.

Further evidence of the improvement experienced by addition of the aforementioned proportions of the indicated oxides can be had by referring to FIG. 2, wherein temperature is plotted as the abscissa and the dielectric constant and the dissipation factor as the separate ordinates of a compound having 75 percent barium titanate, 22 percent strontium titanate, and 3 percent by weight of titanium and cobaltic oxides in equimolar parts. Data was compiled from tests conducted on capacitor discs having an area of 1 millimeter square and a thickness of 25 microns. These capacitors were subjected to varying dielectric biasing fields, the symbol E in kilovolts per centimeter, to determine the dielectric ratings thereof over a range of temperatures.

It is apparent from an inspection of the curves of the particular compound under consideration that the dielectric constants of the samples subjected to different dielectric biasing fields vary non-linearly over the range of temperatures employed. It is also evident that appreciable differences in the dielectric constants of the samples exist depending on the magnitudes of the dielectric biasing fields applied thereto. It follows then, that ferroelectric materials which include the additive oxides have very high dielectric constants at zero bias and an exceptionally wide range of field non-linearity when bias is applied. These properties render these materials invaluable in the fabrication of dielectric components capable of functioning in high D.-C. bias fields.

The curve A represents the dissipation factor over a range of temperatures for a capacitor element fabricated from a sample of the ferroelectric material and having the same dimensions as described previously for the sample depicted in FIG. 2, but to which no D.-C. field is applied. The curve B represents the dissipation factor over a range of temperatures for the same capacitor element which has a residual internal field because a bias voltage of 130 kilovolts per centimeter has been applied thereto.

The curves of FIG. 2 are significant in that they give data on the dielectric constant and dissipation factor at higher electric fields than can be applied to titanates that do not contain the additive.

An inspection of the curves A and B of the same sample with different applied bias fields indicates also that below the Curie temperature, $T_c$, the dissipation factor of the sample described by curve B is substantially uniform and of lower magnitude than that of the sample described by curve A. The difference in the dissipation factor for the two samples is due primarily to the ionic vibrations that occur in the sample with no previous electric history when subjected to an electric field. Additionally, the sample represented by the curve B indicates that the addition of the oxide provides an improved ferroelectric material with a dissipation factor which is not only useful for fabricating dielectric components but which does not deviate from the expected characteristics of such a material.

It is believed that the improvements described for the barium-strontium titanate components containing the additive oxides can also be attained with the ferroelectric niobates, zirconates, and tantalates and with the complexes that can be formed therewith.

Having described the improvements obtained by the addition of particular concentrations of titanium and cobaltic oxides to a barium-strontium complex titanate, it is desirable not to limit the scope of the present invention to the particular ferroelectric material or to the particular compositions thereof used to describe the present invention. Advantageous improvements will be observed with other ferroelectric materials without departing from the scope of the present invention.

What is claimed is:

1. A material whose composition, by weight, is from 97 to 99 percent barium-strontium titanate ferroelectric material together with one to three percent of an additive substance consisting essentially of titanium and cobaltic oxides in equimolar parts.

2. The method of intensifying the dielectric properties of a ferroelectric material which comprises the steps of making a slurry of titanium oxides and barium and strontium compounds of a kind capable of and in proportions such as to form a barium-strontium titanate ferroelectric material and containing also cobaltic oxide and an additional amount of titanium dioxide in equimolar amount compared to the cobaltic oxide, said cobaltic oxide and additional titanium dioxide constituting 1 to 3 percent of the solids, heating said slurry to form a solid, converting said solid to fine particles and forming a body therefrom, reheating said body to approximately 1250 degrees centigrade, converting said body to a mass of fine particles again and reheating to approximately 1250 degrees centigrade, converting said reheated mass to fine particles again and forming a second body with a preferred shape, and reheating for one to two hours at approximately 1360 degrees centigrade dependent upon the thickness of said second body.

References Cited in the file of this patent

UNITED STATES PATENTS

| | | |
|---|---|---|
| 2,576,379 | Woodcock | Nov. 27, 1951 |
| 2,721,182 | Clement | Oct. 18, 1955 |
| 2,729,757 | Goodman | Jan. 3, 1956 |
| 2,731,419 | Goodman | Jan. 17, 1956 |
| 2,738,284 | Calis | Mar. 13, 1956 |
| 2,742,370 | Wainer | Apr. 17, 1956 |
| 2,789,061 | Coffeen | Apr. 16, 1957 |

FOREIGN PATENTS

| | | |
|---|---|---|
| 304,854 | Switzerland | Apr. 1, 1955 |